United States Patent [19]

Kremenets

[11] Patent Number: 4,921,521

[45] Date of Patent: May 1, 1990

[54] METHOD AND FURNACE FOR MELTING INORGANIC MATERIALS

[76] Inventor: Yury D. Kremenets, Apt. 11 B-2 Mt. Vernon Gardens, 885 N. Easton Rd., Glenside, Pa. 19038

[21] Appl. No.: 264,816

[22] Filed: Oct. 31, 1988

[51] Int. Cl.$^5$ ............................................. C03B 5/04
[52] U.S. Cl. ...................................... 65/135; 65/136; 65/335; 65/339; 65/347
[58] Field of Search ................. 65/135, 136, 335, 339, 65/347

[56] References Cited

U.S. PATENT DOCUMENTS

| | | | |
|---|---|---|---|
| Re. 32,317 | 12/1986 | Kunkle et al. | 65/135 |
| 2,097,379 | 10/1937 | McIntyre et al. | 65/339 |
| 2,593,197 | 4/1952 | Rough | 65/335 |
| 4,045,197 | 8/1977 | Tsai et al. | 65/335 |
| 4,113,459 | 9/1978 | Mattmuller | 65/135 |
| 4,798,616 | 1/1989 | Knavish et al. | 65/135 |

FOREIGN PATENT DOCUMENTS

| | | | |
|---|---|---|---|
| 643439 | 1/1979 | U.S.S.R. | 65/335 |
| 842059 | 6/1981 | U.S.S.R. | |

*Primary Examiner*—Joye L. Woodard
*Attorney, Agent, or Firm*—William Freedman

[57] ABSTRACT

This furnace for melting inorganic materials comprises a plurality of spaced-apart inner walls dividing the furnace interior into a plurality of chambers, at least one being a liquefying chamber and at least one being a secondary chamber. Each liquefying chamber is provided with a crown and charge ports adjacent the edges of the crown through which batch material is fed into the liquefying chamber. Batch material entering through one of the charge ports moves down an inclined surface of one of the inner walls where it is heated and part of it liquefied by a flame present in the associated liquefying chamber. This liquefying chamber collects liquefied batch at its bottom and hot gases above the liquefied batch. Between the liquefying chamber and an adjacent secondary chamber, there are one or more passages through which: (i) liquefied batch from the liquefying chamber can flow into the secondary chamber and collect on its bottom and (ii) hot gases from the liquefying chamber can flow into the secondary chamber and pass over the liquefied batch in the secondary chamber.

36 Claims, 8 Drawing Sheets

METHOD AND FURNACE FOR MELTING INORGANIC MATERIALS

INTRODUCTION

The present invention relates to an improved continuous method and tank-type furnace for melting thermally meltable inorganic materials. The invention is particularly applicable to melting glass, including flat glass, container glass, fiber glass and sodium silicate glass. The invention is also applicable to other processes that involve thermal converting of generally flowable, essentially solid state feed material to a molten fluid. These other processes may include metallurgical smelting type operations and fusing of single or multiple component ceramics, glass ceramics, metals or other materials.

BACKGROUND

Conventional glass-melting processes entail depositing pulverulent or granulated batch material onto a pool of molten glass in a furnace and supplying heat to the batch material and molten glass contained in the furnace by the combustion of fuels using preheated air in a space above the molten glass and glass batch material so that the flame passes over them, causing a transfer of heat to them. Additional heat is typically provided to the molten glass by using electric heaters.

In conventional glass-melting furnaces, a chamber for containing the molten glass is provided. This chamber comprises the bottom of the furnace, two spaced side walls, a first end wall and a second end wall which is spaced from and opposite to the first. The chamber is confined from above by a crown exhibiting a curve across the furnace between the side walls. In the vicinity of the first end wall, raw batch materials are fed through an opening into the furnace, and completed molten glass is removed from the furnace in the vicinity of the second end wall for further forming.

Fuel-fired furnaces fall into two types: side-fired and end-fired. The side-fired furnaces are provided on their outside with a heat recovery system including regenerators or recuperators. In the side-fired furnaces, firing direction does not influence glass quality; they are less sensitive to charging techniques; but they have higher construction cost, lower fuel efficiency and require more room. As to the conventional end-fired furnaces, they have better fuel efficiency, lower construction cost, require less room, but generally have lower glass quality because the firing direction influences charging patterns.

As discussed in U.S. Pat. No. 4,559,071—Kunkle et al, melting glass in tank-type furnaces has a number of drawbacks. A main drawback is the need to carry out several partly incompatible operations simultaneously within the same chamber. Thus, the melter chamber is expected to liquefy the glass batch material, to dissolve grains of the batch, to homogenize the melt product, and to refine it by freeing it of gaseous inclusions. As a result, inhomogeneities exist within the melt product because of different melting temperatures of the different components of the glass. In order to decrease such inhomogeneities, the usual tank-type furnace contains a relatively large volume of molten glass in which recirculating flows are provided. Maintenance of necessary temperatures both for said recirculating flows and for a large chamber results in inefficient use of thermal energy. Furthermore, it is known that some components of the batch such as limestone tend to melt out earlier than the sand and sink into the melt as globules, whereas sand tends to form a residual unmelted scum on the surface of the melt. This increases inhomogeneities in the melt.

A major rate-limiting step of the melting process is the rate at which partly melted liquefied batch runs off the batch pile to expose underlying parts of the batch to the heat of the furnace. The conventional process of floating a layer of batch on a pool of molten glass is not particularly conducive to aiding the runoff rate, in part because the batch is partially immersed in the molten glass. Convective heat from the pool of molten glass induces considerably less runoff than radiant energy. Conventional overhead radiant heating is inefficient because only one side of the batch is exposed to overhead radiant heat sources, and only a downwardly directed part of radiant energy heats the batch. Considerable energy is wasted through the superstructure of the furnace and causes thermal degradation of the refractory roof components.

Furthermore, in all furnaces that I am aware of, it is not feasible to produce more than one type of melt in one furnace at the same time.

Some proposals have been made to overcome some of the problems of the conventional tank-type melting furnace by way of isolating the initial process of liquefying batch material from the remainder of the melting process (e.g., U.S. Pat. Nos. 4,381,934; 4,492,594; 4,496,387; 4,539,034; 4,559,071; 4,604,121; 4,634,461; 4,654,068). In U.S. Pat. No. 4,559,071, for example, there is proposed a combined plant containing at least one special vessel or drum having a burner (for carrying out the process of liquefying batch material) and disposed below it a tank-type furnace (for providing the next melting operations). Said tank-type furnace is supplied with the additional means for heating. According to this U.S. Pat. No. 4,559,071, this method and furnace provide better fuel efficiency, i.e., 5.4 million BTUs per ton of glass produced versus 6.25 million BTUs per ton of glass produced in the conventional glass-making tank-type furnace. A disadvantage of the above type of combined plant is that it has a small throughput. To provide liquefied batch to a furnace of large scale, using a plurality of smaller liquefying units is considered more economical than using a large single liquefaction vessel. But the size of the liquefied batch charge zone increases as the number of liquefying units charging the furnace grows. To provide liquefied batch to a 500-ton capacity furnace by utilizing a plurality of the largest of said liquefying units (U.S. Pat. No. 4,604,121) with 30 tons per day throughput and a 130 cm inner diameter, I calculate that a charge zone of at least 60 square meters is needed. So, usage of the above type combined device for large capacity furnaces does not seem feasible.

Another proposal for heat pretreating glass batch for the liquefaction process is made in U.S. Pat. No. 4,604,121. In this patent, a rotary drum for feeding batch material is connected to a special vessel positioned below it, where batch material is partially melted as a first step in the melting process. To complete the melting process, a tank-type furnace, fed from the special vessel, is used. Exhaust gases from the special vessel are used for preheating the batch material in the drum. This combined plant has actually three type devices, which leads to higher maintenance and construction costs.

In USSR patent specification No. 842,059, issued June 30, 1981, a tank-type end-fired furnace for melting of rock batch, such as basalt rock, is proposed. This tank-type furnace comprises side and end walls, a bottom and a crown supported by said end walls and exhibiting a curve along the furnace, while the charge ports are formed between the side walls and the sides of the roof in the furnace cross section. Two arch bridges between each side wall and the bottom form two channels connected near one end wall with the inner gas space that is located within the confines of the furnace walls.

Batch feeding is provided through charge ports along the furnace. While gradually moving down along the side walls, the rock batch is exposed to the radiant energy of the burner, and is thus converted into melt that flows down to the bottom, then flows along the furnace to the exit end wall. Such a furnace design allows an increase in the specific output, or specific melting capacity and provides heat recovery from exhaust gases by preheating burner supply air and by additional batch heating through the walls of the said channels. However, this furnace is limited in its application to the processing of one-component rock batch, which requires only a one-step operation for conversion into a completely molten product. To produce melt from multi-component batch such as batch for different sorts of glass or fiber glass, more operations, including refining the melt by freeing it of gaseous inclusions, are required.

SUMMARY OF THE INVENTION

In accordance with one form of the present invention, the entire process of melting batch materials including the liquefaction step as an initial step is provided in the tank-type furnace without the additional vessels or drums used in certain prior art for this initial step. In carrying out the invention in one form, I divide the interior furnace space into two longitudinally-extending side-by-side chambers, one a liquefying chamber equipped with a combustion-type burner for providing the liquefaction step and the other a secondary chamber where the remaining steps in the entire melting process are carried out. This enables me to create a tank-type end-fired furnace with medium or large throughput which has a smaller size compared to the conventional furnaces. Furthermore, a longitudinally-extending preheating compartment adjacent to a charging hopper and the ceiling of the secondary chamber provides both heat exchange from combustion gases to the air supplying the burner and batch preheating. This efficient solution provides considerable heat recovery inside the furnace without conventional regenerators, recuperators and preheaters outside the furnace, which are quite expensive and require considerable maintenance. In my furnace, the combustion gases carry out the following functions:

(1) in the liquefying chamber they work as a medium for heat transfer to the batch;
(2) in the secondary chamber they work as an insulating medium, decreasing heat transfer from the melt (which may be additionally electrically heated) to the walls and crown. (Such effect can be enhanced by increasing combustion gas velocity as a result of decreasing the secondary chamber cross section area versus the cross section area of the liquefying chamber.)
(3) in the preheating compartment they work as a heat source for heat transfer: (i) to the tubes with air supplied to the burner; (ii) to the batch in the charge hoppers.

A steady-state condition of the batch layer in the liquefying chamber is maintained by the constant pressure of batch column in the charging hopper. From a plurality of charging hoppers the batch is fed through charging ports into the liquefying chamber and forms a layer on the sloping surface of an inner wall or on the inner surface of a side wall. When a portion of liquefied batch layer flows down to the bottom, a new portion of batch moves down from the charging port to replace liquefied batch.

The invention provides flexible control over different steps of the melting process, in part, because the level of the melt in the liquefying chamber is higher than that in the secondary chamber, and this makes the rates at which the steps are performed in different chambers independent.

The invention allows me to produce more than one type of melt in one furnace at the same time and makes it possible to vary the furnace output by changing charge area size.

The life term of the furnace, which is usually limited by the life term of superstructure subjected to the thermal degradation, is longer in my furnace because it is constructed to permit replacing a damaged crown since the crown of my furnace rests on the end walls instead of being built into the walls.

OBJECTS OF THE INVENTION

An object of this invention is to provide a furnace having a large specific output, or specific melting capacity and capable of completely melting batch by a plurality of operations, including liquefying as only a first step, all within the furnace itself.

Another object is to provide a method for completely melting batch by a plurality of operations, including liquefying as only a first step, all within a single furnace.

Another object is to construct this furnace in such a manner that it has exceptionally low heat losses and exceptionally full heat recovery characteristics and to attain this object without requiring outside the furnace regenerators, recuperators, or preheaters.

Another object is to construct a melting furnace inside which two or more types of melt can be simultaneously produced.

Other objects and advantages of the invention will be apparent from the following detailed description of various embodiments.

BRIEF DESCRIPTION OF DRAWINGS

For a better understanding of the invention, reference may be had to the following detailed description taken in conjunction with the accompanying drawings, wherein:

FIG. 3 is a longitudinal sectional view taken along the line 3—3 of FIG. 1.

FIG. 5 is a horizontal sectional view of another modified form of my furnace taken along the line 5—5 of FIG. 6. FIG. 5 is reduced in scale as compared to FIG. 6.

DETAILED DESCRIPTION OF ILLUSTRATED EMBODIMENTS

For illustration purposes, the invention will be described as practiced for melting glass batch materials, but it should be understood that the invention is applicable to the melting of similar materials as well, and may include metallurgical smelting type operations and fusing of single or multiple component ceramics, metals or other materials.

Figure 1:
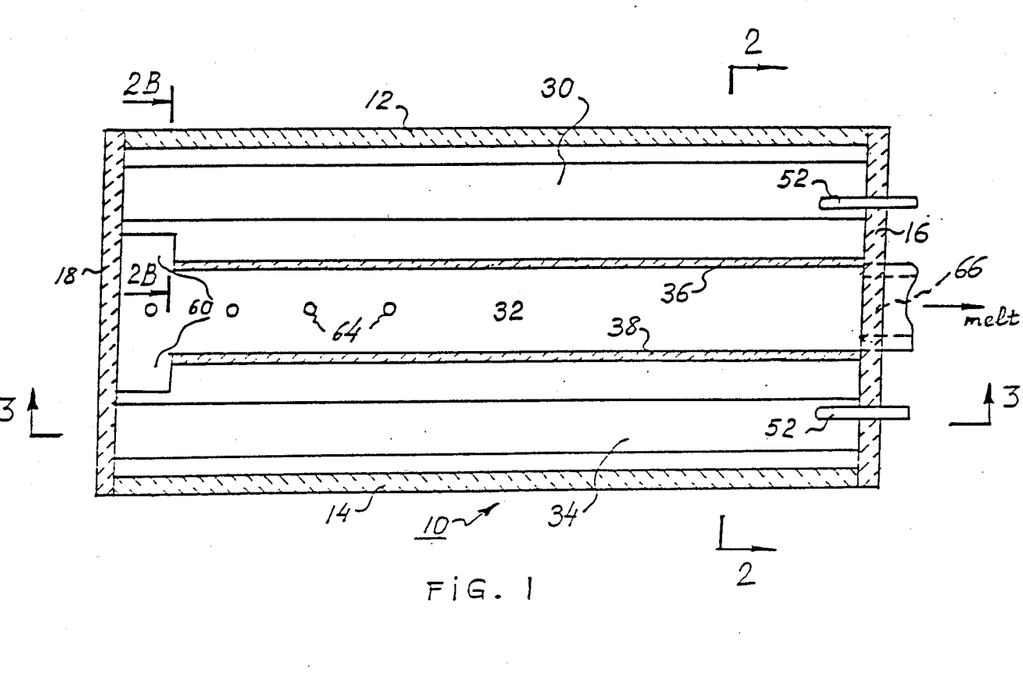
FIG. 1 is a horizontal sectional view of one form of my furnace taken along the line 1—1 of FIG. 3.
Figure 2:
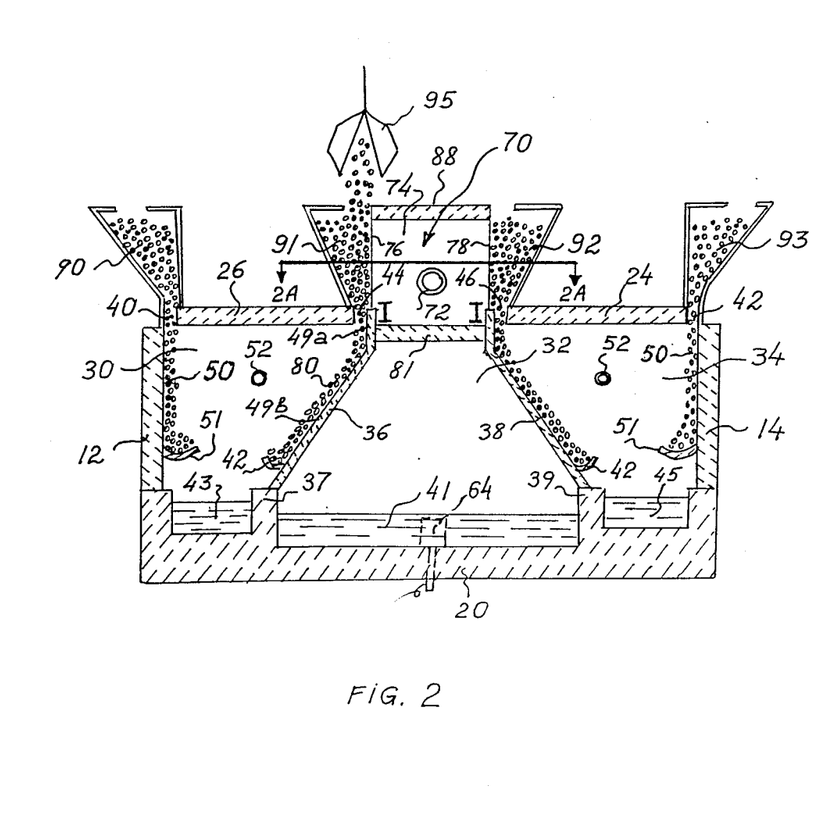
FIG. 2 is a vertical cross-sectional view taken along the line 2—2 of FIG. 1.

Referring now to FIGS. 1—3, there is shown a glass-making tank-type end-fired furnace 10 that includes first and second spaced-apart side walls 12 and 14, respectively, first and second spaced-apart end walls 16 and 18, respectively, and a bottom generally designated by the numeral 20. The furnace is covered, in part, by two curved crowns 24 and 26 that rest on the end walls 16 and 18 and have lateral edges extending along the length of the furnace. The crowns exhibit their curves along the length of the furnace, as shown in FIG. 3.

Referring to FIG. 2, the furnace is divided into three chambers 30, 32 and 34 by two laterally-spaced inner wall components 36 and 38, each extending along the length of the furnace between its end walls 16 and 18. As will soon be explained, outer chambers 30 and 34 are liquefying chambers, and the central chamber 32 is a secondary chamber.

The bottom 20 includes two spaced-apart vertically-projecting partitions 37 and 39 that divide the bottom into a central reservoir 41 and two outer reservoirs 43 and 45 on opposite sides of the central reservoir. The central reservoir 41 is located in the secondary chamber 32, and the two outer reservoirs are located in the liquefying chambers 30 and 34, respectively. The inner wall components 36 and 38 rest on top of the partitions 37 and 39, respectively. One of the inner walls may be thought of as comprising components 36 and 37, and the other as comprising components 38 and 39.

The bottom, the outer walls, and the crowns of the furnace are constructed of conventional refractory materials typically used in glass-making furnaces. The inner wall components 36 and 38 are made of a suitable ceramic material such as silica made from crushed and ground quartzite and a few percent lime as a binder.

A first pair of charge ports 40 and 42 are formed in the furnace cross-section between the top portions of the side walls 12 and 14 and the adjacent outer edges of the crowns 12 and 14, respectively. A second pair of charge ports 44 and 46 are formed between the top portions of the inner wall components 36 and 38 and the adjacent inner edges of the crowns. Immediately above each charge port is a charging hopper from which batch material is fed through the associated charge port into a liquefying chamber of the furnace. These hoppers are designated 90, 91, 92 and 93. Each is shown in FIG. 2 loaded with batch material, loading being effected by a clamshell bucket 95.

The inner wall components 36 and 38 of the furnace are so shaped that the cross-section of each liquefying chamber 30 and 34, as shown in FIG. 2, narrows from the charge ports down to the bottom 20. Each inner wall component 36 and 38 consists of an upper portion having a vertical surface 49a in the vicinity of the charge port and a lower portion having an inclined surface 49b sloping at an angle not less than natural angle of repose for the batch. To prevent batch from sliding unimpeded down the inner wall components 36 and 38 to the bottom 20, each inner wall component has a barrier 42 projecting from the inner wall and extending along the length of the inner wall in a location spaced a short distance from the bottom 20. A similar barrier 51, but considerably wider than the barrier 42, is provided on each side wall near the bottom 20.

Each of the liquefying chambers 30 and 34 is confined by one of the crowns 24 or 26 from above, by the bottom 20 from below and, at its sides, by the two end walls, one side wall and one inner wall. Within each of the liquefying chambers, there is a gas burner 52 supported on one end wall 16 and developing a longitudinally-directed flame 53 (FIG. 3). Each liquefying chamber has inside space for the hot exhaust gases developed by the flame and for liquefied batch transferring. The bottom of each liquefying chamber has a downhill slope of between 1° and 5°, depending on the furnace length and melt viscosity, directed, as the flame is, toward the second end wall 18. The melting process, which is initiated in the liquefying chambers 30 and 34, is completed in the secondary chamber 32. To this end, in the vicinity of the end wall 18, each liquefying chamber 30 or 34 is connected with the secondary chamber 32 by openings, or passages, 60 and 62 in the intervening inner wall for enabling liquefied batch and hot exhaust gases to pass through these openings from the liquefying chamber into the secondary chamber 32. Opening 60 is for the hot gases, and opening 62 is primarily for the liquefied batch. Electrodes 64 for additional heating extend through the bottom 20 into the reservoir 41 at the bottom of secondary chamber 32. The secondary chamber has an outlet 66 through the first end wall 16 for removing complete melt product from the furnace and delivering it to a feeder, or forehearth 67. As viewed in FIG. 2, the cross-sectional area of the secondary chamber 32 is less than the sum of the cross-sectional areas of the liquefying chambers 30 and 34.

Figure 2A:
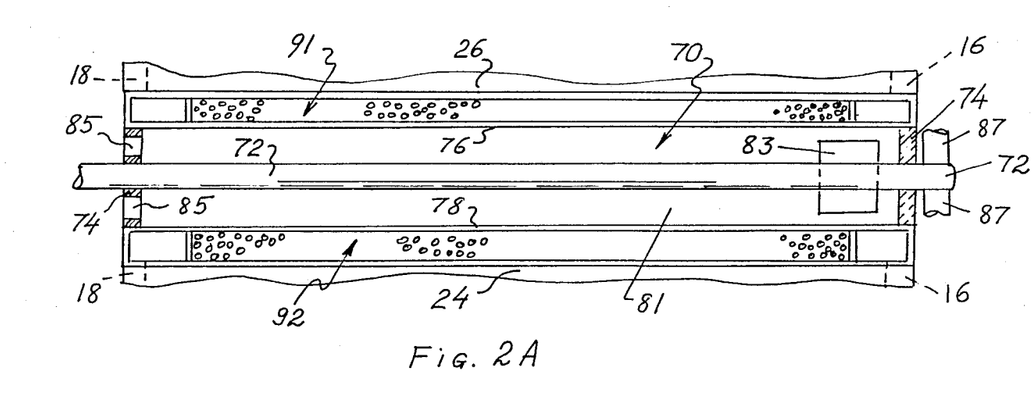
FIG. 2A is a sectional view along the line 2A—2A of FIG. 2.

Above the secondary chamber 32 is a compartment 70 that extends longitudinally of the furnace and encloses an air supply tube 72 for burners 52, which tube also extends longitudinally of the furnace. Referring to FIG. 2A, compartment 70 has end walls 74, side walls 76 and 78, and a bottom wall 81 constituted by the ceiling of the secondary chamber 32. The compartment 70 also has a roof 88. In the vicinity of the first end wall 16 of the furnace, there is an opening 83 in the bottom wall 81 of compartment 70 that interconnects the secondary chamber 32 and the compartment 70. Adjacent the second end wall 18, there are openings 85 in the end wall 74 of compartment 70 through which exhaust gases are removed from compartment 70. Each of the side walls 76 and 78 of compartment 70 is a metal wall which serves also as one wall of the adjacent hopper.

The air supply tube 72 supplies air to the burners 52. To this end, the supply tube 72 is connected with the burners 52 by suitably insulated short tubes 87 outside the furnace and immediately adjacent the end wall 16, as shown in FIG. 2A. The hot exhaust gases that flow through the compartment 70 between its end walls 74 heat the supply tube 72 and thus preheat the air supplied to the burners 52, as will be further referred to later.

As best shown in FIG. 2, raw pulverulant or granular batch material is fed from each of the inner charging hoppers 91 and 92 through its associated charge port 44 or 46 into the associated liquefying chamber 30 or 32 in the form of a batch layer 80 on the sloped surfaces of the two inner walls 36 and 38. This batch layer 80 consists of two parts: an underlying stable layer and an upper transient layer, the underlying stable layer having a thickness of at least 3 cm. A steady-state condition of the batch layer 80 in the liquefying chamber is maintained by the constant pressure of the batch column in the charging hopper. As a result of heating by the flames 52 in the liquefying chamber, a portion of liquefied batch layer flows down to the bottom 20, and at the same time another portion of batch moves down, replacing the displaced portion of liquefied batch.

Similarly, raw batch material is fed from each of the outer charging hoppers 90 and 93 along the associated side wall 12 or 14 into the associated liquefying chamber 30 or 34, developing a batch layer 50 along the side wall surface. The flame 53 in the associated liquefying chamber melts the surface of batch layer 50 in essentially the same manner as it melts the surface of batch layer 80. An advantage of locating a batch layer (such as 50) on a side wall is that such a batch layer provides thermal insulation for the side wall, reducing heat loss through the side wall, and thus increasing the thermal efficiency of the furnace.

Liquefaction is carried out by melting the lowest-temperature-melting components of the batch. The disposition of the batch layer and the burner flame direction is such that the liquefied batch flows down across the flame direction, creating conditions for good quality glass production. This disposition also provides more efficient usage of the burner energy due to productive impingement of radiant energy upon the surrounding batch surface. A high temperature heat source, such as an oxygen-enriched flame, reduces the volume of the combustion gases, which, in turn, results in decreasing the required furnace length and diminishing a tendency of the fine batch to become entrained in the exhaust gases. Liquefied batch flows down to the bottom 20 and then transfers along the liquefying chamber.

Figure 2B:
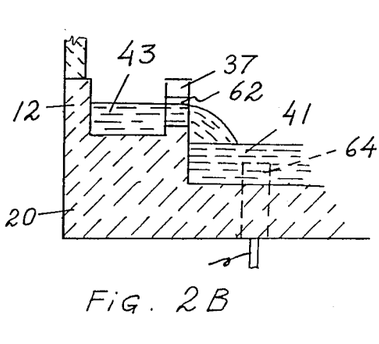
FIG. 2B is a sectional view along the line 2B—2B of FIG. 1.

In the vicinity of the end wall 18, the molten product passes into the secondary chamber 32 through the opening 62, as best shown in FIG. 2B. Since the opening 62 of FIG. 2B is located at a higher level than the normal level of the melt in the secondary chamber, the melt in the liquefying chamber rises to a higher level than the level of the melt in the secondary chamber before passing between the two chambers. Due to the higher level of the molten product in the liquefying chambers 30 and 34 compared to the level in the secondary chamber 32, the liquefaction step in chambers 32 and 34 runs independently from the remainder steps in the secondary chamber. The bottom of the liquefying chamber preferably has a slope of about 1 to 5 degrees towards the end wall 18 to increase the rate of melted flow.

In the secondary chamber, additional heating is provided by means of electrodes 64 which extend through the bottom 20 into the melt at spaced points along the length of reservoirs 41. As a result of this additional heating for completing of the melting process, still-solid residual grains of batch feed are dissolved in the liquefied batch and then refining of the melt product takes place. In the secondary chamber 32, the completely melted and refined melt product is removed through the outlet 66 in the end wall 16.

Figure 1A:
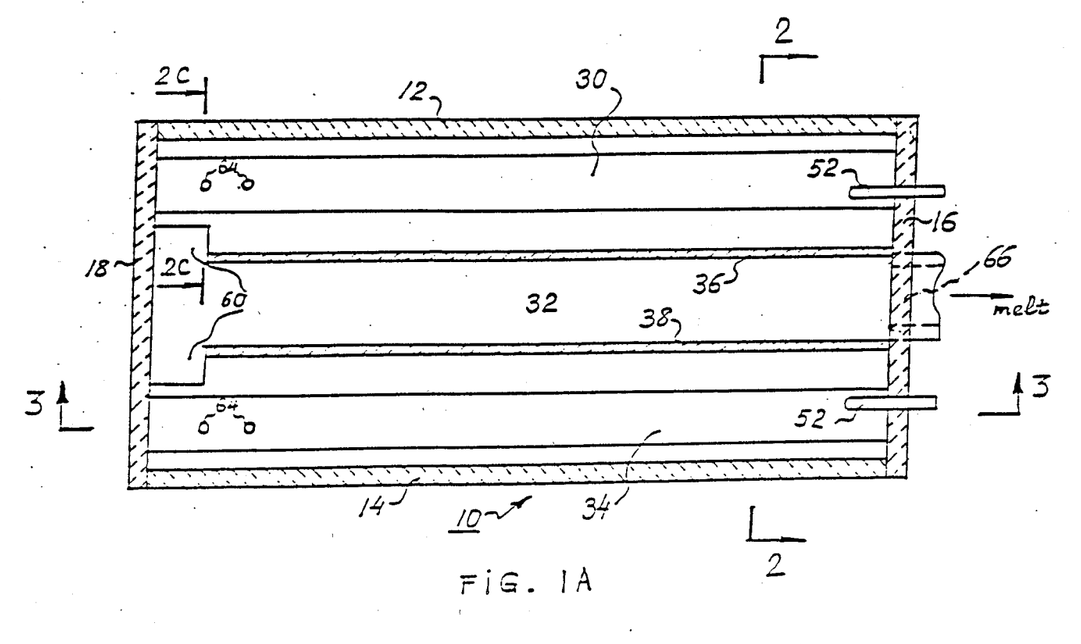
FIG. 1A is a view similar to FIG. 1 except showing a modified form of the invention.
Figure 2C:
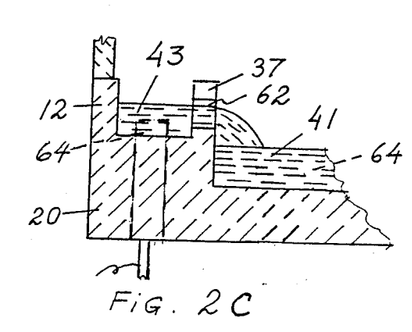
FIG. 2C is a sectional view illustrating a modified form of the invention as viewed along the line 2C—2C of FIG. 1A.

In a modified form of the invention shown in FIGS. 1A and 2C, I locate the electrodes 64 in the liquefying chambers 30 and 34 instead of in the secondary chamber 32. Preferably, such electrodes are disposed in spaced-apart relationship along the length of the liquefying chambers in the region of the second end wall 18. In this modified form, the heat developed by the electrodes serves essentially the same purposes as in the illustrated embodiment, i.e., dissolving still-solid grains of batch and then refining the melt product. In still another modified form of the invention (not shown), auxiliary heating electrodes are located in the region of the second end wall in both the secondary and the liquefying chambers.

Combustion gases produced and collected in each of the two liquefying chambers 30 and 34 are transferred along it and pass through the inner wall openings 60 in the vicinity of the second end wall 18 into the secondary chamber 32. These hot gases then flow along the length of the secondary chamber 32 toward end wall 16, exiting the secondary chamber through the opening 83 in the ceiling 81 of the secondary chamber 32, and then flow in a reverse direction along the length of compartment 70, exiting at the opposite end wall 18 through openings 85 leading to a smoke exhauster (not shown). In the compartment 70, heat from the hot exhaust gases is transferred: (1) to the metal tube 72 supplying air to the burner and (2) to the batch in the charging hoppers 91 and 92, via the metal partition walls 76 and 78. Each metal partition wall 76 or 78 is common to a hopper and the longitudinal compartment 70. The heat recovery process runs efficiently due to: (1) the large surfaces of heat exchange of said metal partition walls 76 and 78 and of the tube 72 supplying air to the burner, and (2) the large temperature differences between exhaust gases and said heat exchange surfaces.

Because the secondary chamber 32 has a smaller cross section, as viewed in FIG. 2, than the sum of the cross sectional areas of the two liquefying chambers 30 and 34, the combustion gases flowing first through the two liquefying chambers and then the secondary chamber have a greater velocity in the secondary chamber than in the liquefying chambers. This increased velocity results in decreased heat transfer between the melt in the secondary chamber and the cooler combustion gases, thus reducing temperature loss of the melt in the secondary chamber to the combustion gases.

Figure 4:
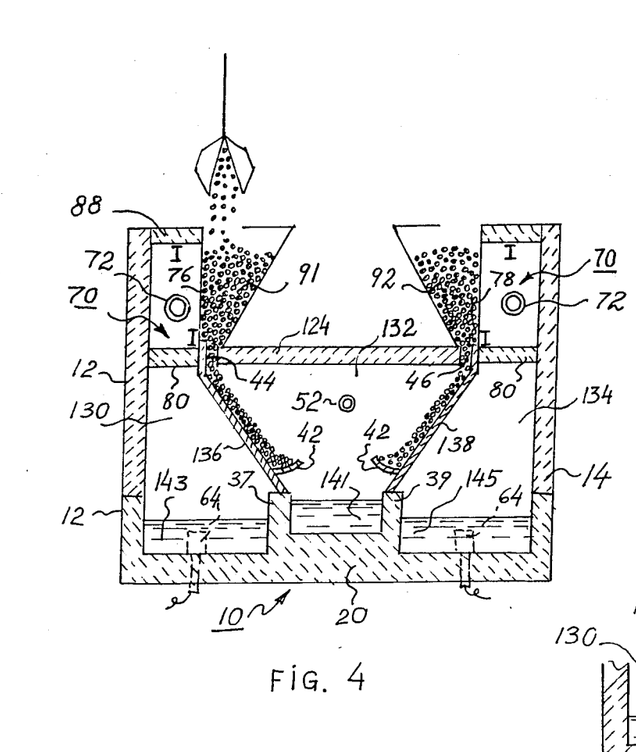
FIG. 4 is a vertical cross-sectional view of a modified embodiment of my invention taken along a line corresponding to line 2—2 of FIG. 1.

A second embodiment of this invention is shown in FIG. 4. In this embodiment, the central chamber 132 of the furnace is a liquefying chamber, and the two outer chambers 130 and 134 are secondary chambers. The central chamber is divided from the outer chambers 130 and 134 by spaced-apart inner wall components 136 and 138. The bottom 20 is provided with two partitions 37 and 39 dividing the bottom region into three reservoirs 141, 143 and 145.

Each inner wall 136, 37 and 138, 39 includes passage means (not shown) corresponding to the passage means 60, 62 of the FIGS. 1–3 embodiment. Through passages 62 in partitions 37 and 39, molten batch can pass from central reservoir 141 into the two outer reservoirs 143 and 145. Through passages 60 hot gases can pass from central chamber 132 into the two secondary chambers 130 and 134.

The liquefying chamber 132 is covered by a curved crown 124 rested on the end walls of the furnace. Between the lateral edges of the crown 124 and the upper portions of the inner wall components 136 and 138 are two charge ports 44 and 46 through which pulverulant batch material is fed into the liquefying chamber. These ports are supplied from hoppers 91 and 92 located above them. Batch material from each hopper is fed through the associated port and onto the inclined surface of the associated inner wall. A projecting barrier 42, corresponding to a similarly-designated barrier in FIGS. 1–3, blocks the downward motion of the solid batch and holds it in place on the inclined surface of the inner wall component 136 or 138.

In the liquefying chamber 132, a burner 52, corresponding to each of the similarly-designated burners of FIGS. 1–3, develops hot gases that heat the batch material resting on the inner wall components 136 and 138, melting the exposed outer layer of the batch material and causing the molten product to flow down into the reservoir 141 of the liquefying chamber 132. The bottom of the reservoir 141 has a downward slope of 1° to 5° between the furnace end walls so that the molten batch therein tends to flow toward one end wall (i.e., the end wall corresponding to 18 of FIG. 1) and then via passages 62 into the secondary reservoirs 143 and 145.

The hot gases developed by the flame in liquefying chamber 132 pass through openings (60) in the inner walls into the secondary chambers 130 and 134, then passing over the molten batch in the secondary chambers. Additional heating of the molten batch in the secondary chambers is effected by spaced-apart electrodes 64 in the bottom of each secondary chamber, corresponding to the electrodes 64 of FIG. 3. The hot combustion gases, while passing over the molten batch in the secondary chambers, act like an insulating medium which reduces heat losses from the molten batch to the side walls 12 and 14 and the end walls 16 and 18 via the space above the molten batch.

Above each of the secondary chambers 130, 134 is a compartment 70 corresponding to a similarly-designated compartment in FIGS. 1–3. The walls of the left-hand compartment 70 are defined by a ceiling 81 of the secondary chamber 130 by a metal wall 76 of the adjacent hopper 91, a part of side wall 12, and by a roof 88. Hot gases from the secondary chamber 130 pass into the compartment 70 via an opening (such as 83 in FIG. 2A) near the end wall 16 and flow in a reverse direction through the compartment, exiting through a passage (not shown) in the opposite end wall 18.

An air supply pipe 72 for the burner 52 passes through the compartment 70, and the air flowing therethrough is heated by the hot gases flowing in the reverse direction through compartment 70. The hot gases in compartment 70 also heat the raw batch material in adjacent hopper 91, transferring heat to the batch material through the metal wall 76 that is shared by the hopper and compartment 70.

The right-hand compartment 70 houses another air supply pipe 72 for the burner 52. Hot gases pass through this compartment 70 in the same manner as through the left-hand compartment 70 and likewise transfer heat to the pipe 72 and to the batch material in the adjacent hopper 92.

In the FIG. 4 embodiment, each secondary chamber 130 and 134 is provided with an outlet from its liquid reservoir region adjacent end wall 16 for enabling the melt to be removed therefrom for further use.

In the FIG. 4 embodiment, the secondary chambers 130 and 134 have a total cross-sectional area, as viewed in FIG. 4, which is less than that of the liquefying chamber 132, thus increasing the velocity of the combustion gases in the secondary chamber and reducing the heat losses from the melt to the combustion gases and further to the side walls 12 and 14.

Figure 5:
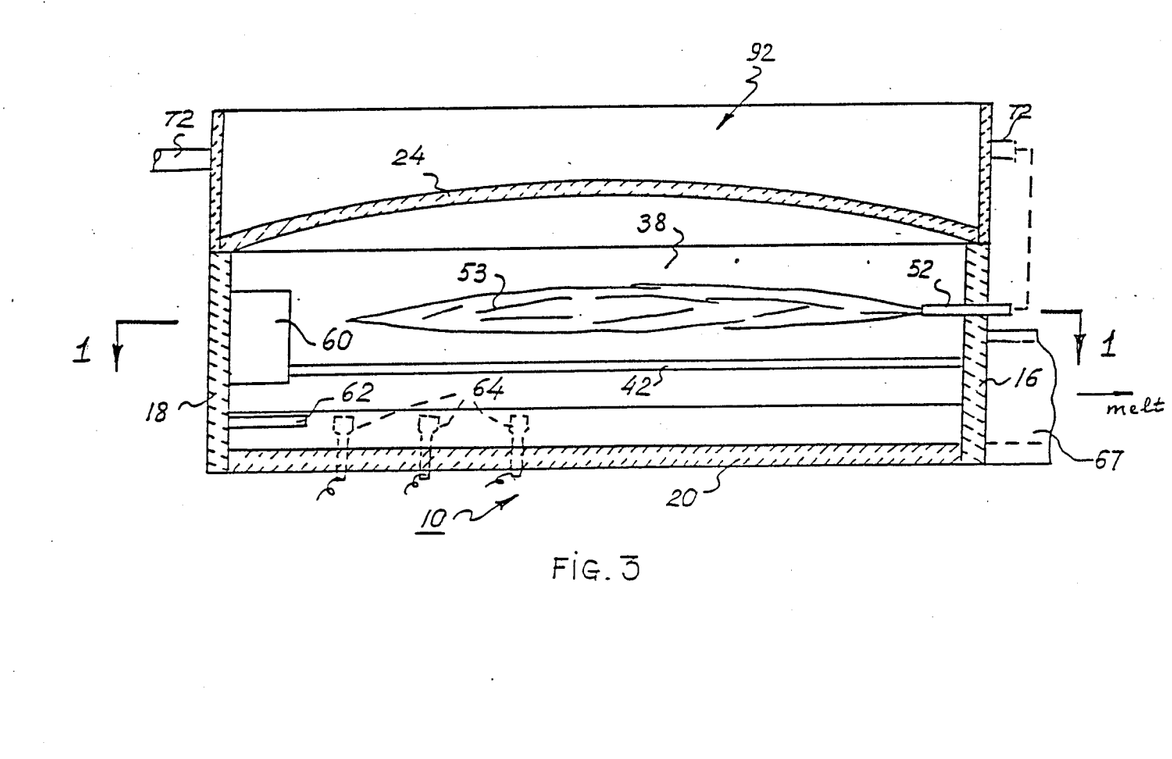
Figure 6:
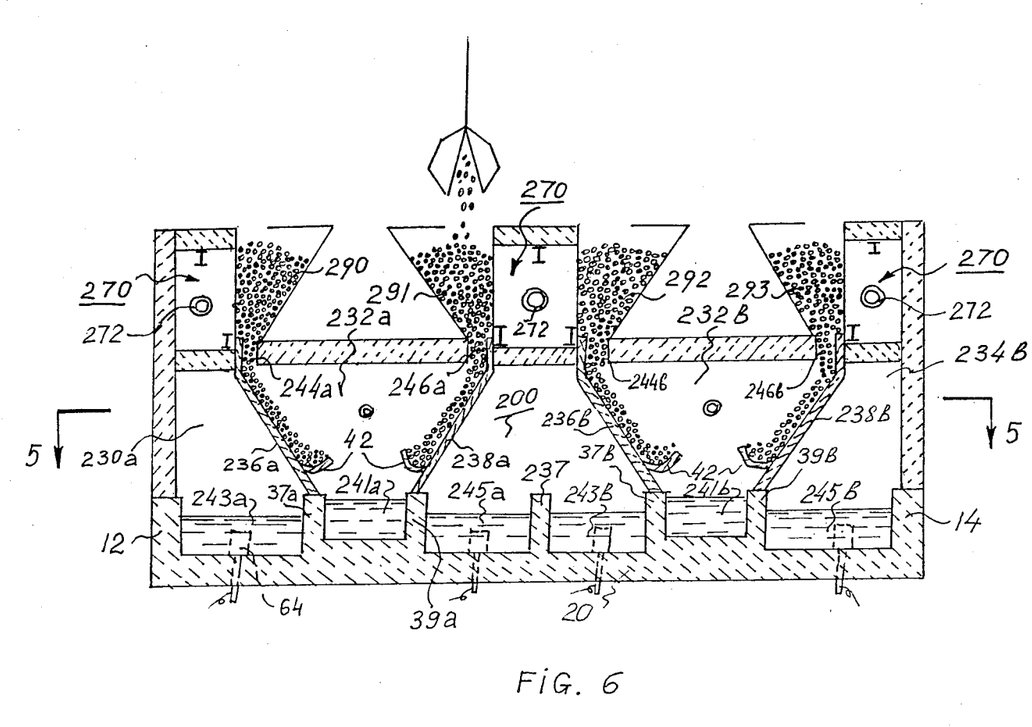
FIG. 6 is a vertical cross-sectional view taken along the line 6—6 of FIG. 5.

The embodiment of FIGS. 5 and 6 comprises two groups of liquefying and secondary chambers, each group having its chambers arranged in basically the same manner as in FIG. 4. The two groups, which are located in side-by-side relationship, share a secondary chamber 200 that is located between them and also a preheating compartment 270 that is located between them.

In general, the components of FIGS. 5 and 6 that correspond to similar components in FIG. 4 are designated with the same reference numerals as used in FIG. 4 or with reference numerals differing only in their first digit (i.e., containing a "2" instead of a "1") and in including an "a" or "b" suffix. The "a" suffix is used with the left-hand group of components, and the "b" suffix with the right-hand group of components.

The left-hand group comprises a liquefying chamber 232a and two secondary chambers 230a and 200 at opposite sides of the liquefying chamber. The right-hand group comprises a liquefying chamber 232b and two secondary chambers 234b and 200 located at opposite sides of the liquefying chamber. Auxiliary heating electrodes 64 are located in the secondary chambers 230a, 200 and 234b.

Projecting from the bottom 20 in FIGS. 5 and 6 are spaced-apart partitions 37a, 39a, 237, 37b and 39b that run the length of the furnace. Between partitions 37a and 39a, there is a reservoir 241a for the liquefying chamber 232a. Between partition 37a and side wall 12 there is a secondary reservoir 243a for secondary chamber 230a; and between partitions 39a and 237 there is a secondary reservoir 245a for secondary chamber 200. The right-hand partitions 37b, 39b and 237 define between them similar reservoirs 241b, 243b and 245b for the right-hand group of chambers.

The two liquefying chambers 232a and 232b are fed with raw batch material by hoppers 290–293 in the same manner as in the FIG. 4 embodiment. The left-hand liquefying chamber 232a has charge ports 244a and 246a through which batch material is conveyed to the liquefying chamber. Inner wall components 236a and 238a provide sloping surfaces for receiving the batch in the same manner as do the inner wall components 136 and 138 of FIG. 4. Barriers 42 on the inner walls correspond to the barriers 42 of FIG. 4.

The right-hand liquefying chamber 232b has corresponding charge ports 244b and 246b, sloping walls 236b and 238b and barriers 42 for supplying and holding the entering batch material.

Above each of the secondary chambers there is a preheating compartment 270 corresponding to the preheating compartment 70 of FIG. 4. In each of the liquefying chambers 232a and 232b, there is a burner 52 corresponding to the burner 52 of FIGS. 1–3, and these burners are supplied with air by pipes 272 passing through the preheating compartments 270. Hot exhaust gases from the flame in each liquefying chamber, after gathering in the liquefying chamber, pass through openings 260 in the inner walls (236a, 238a, 236b, 238b) into the secondary chambers. The hot gases then flow through the secondary chambers toward end wall 16, then through ceiling openings into the preheating compartments 270, then in a reverse direction along the length of preheating compartments 270, exiting through openings at the other end wall 18. As in the embodiment of FIG. 4, these hot gases act like a thermal insulating medium over the molten product in the secondary chambers and, in the compartments 270, heat the air flowing through pipes 272 and also heat the raw batch material in the adjacent hopper.

In the embodiment of FIGS. 5 and 6, the partition 237 in the central secondary chamber divides the reservoir space into two secondary reservoirs 245a and 243b. This partition 237 is imperforate and thus isolates the molten batch in the two adjacent secondary reservoirs from each other. This isolation enables me to use the furnace of FIGS. 5 and 6 for processing two different types of batch material at the same time. One type is melted in the left-hand group of chambers, and the other type is melted in the right-hand group of chambers. Although the hot gases from the two sets of chambers communicate in common secondary chamber 200, the melts do not communicate since they are isolated from each other by the imperforate perforate partition 237 in the secondary chamber 200. As shown in FIG. 5, the melts are removed from the furnace through suitable outlets in the end wall 16.

The design of FIGS. 5 and 6 is especially suited to furnaces of large throughput. My calculations made for a furnace of this design having an output of 600 tons of glass per day show that for the batch formula employed in the commercial manufacture of flat glass (i.e., sand, soda ash, limestone, dolomite, and rouge), the total energy required for melting glass in such a furnace would be about 4.4 million BTUs per ton of glass produced, or about 70% of the amount of the energy used in a typical conventional tank-type furnace (which consumes about 6.25 million BTUs per ton of glass produced). The calculated specific output, or specific melting capacity, for my furnace would be about 2 sq. feet per ton per 24 hours as compared with a specific output for the typical conventional tank-type furnace of about 6.7 sq. feet per ton per 24 hours.

Figure 7:
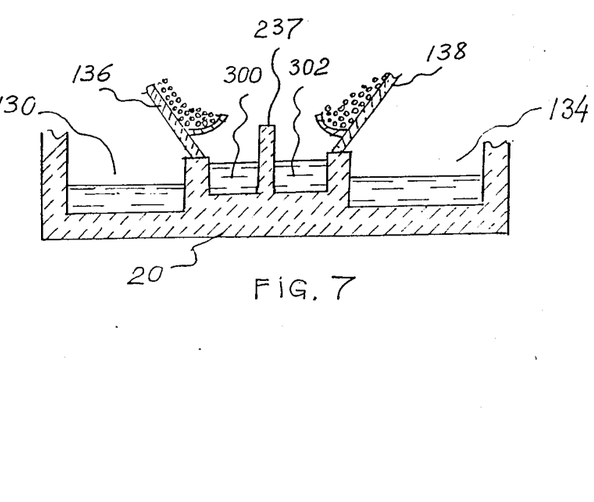
FIG. 7 is a sectional view similar to that of FIG. 4 illustrating still another embodiment.

FIG. 7 shows another embodiment of the invention, similar to that of FIG. 4 except having an imperforate partition 237 between the two partitions 37 and 39 and dividing this reservoir space into two separate sub-reservoirs 300 and 302. The presence of this imperforate partition 237 allows two different types of molten product to be simultaneously produced in this furnace. One type of batch material is fed onto the inner wall component 136, where a portion is liquefied by flame from the associated burner and the resultant liquid product is collected in sub-reservoir 300. Another type of batch material is fed onto the other inner wall component 138, where a portion is liquefied by flame from the burner, and the resultant liquid product is collected in sub-reservoir 302.

The melt collected in sub-reservoir 300 is transferred to secondary chamber 130 where it is further heated and refined in the same manner as explained hereinabove in connection with FIG. 4. Similarly, the melt from sub-reservoir 302 is transferred to secondary chamber 134 where it is further heated and refined in the same manner as explained hereinabove in connection with FIG. 4.

The embodiment of FIG. 7 includes in each of its inner walls passages 60 and 62 (not shown, but corresponding to those of FIGS. 1-3) for allowing the hot gases and melt in each liquefying chamber to flow into the adjacent secondary chamber.

Although a centrally-located burner is used in the FIG. 4 embodiment, it is to be understood that this burner may be appropriately offset from the center to accommodate the different types of batches present in the FIG. 7 embodiment. Alternatively, two spaced-apart burners can be used, one for each type of batch material.

It is to be further understood that in each of the embodiments two or more burners may be substituted for any single illustrated burner.

The furnace of FIG. 2 can also be provided with an imperforate barrier (not shown) extending parallel to partitions 37 and 39 for dividing the bottom region of the secondary reservoir 41 into two separate and isolated sub-reservoirs at its opposite sides. In such embodiment, the left-hand subreservoir receives melt from the left-hand liquefying chamber 30, and the right-hand sub-reservoir receives melt from the right-hand liquefying chamber 34. In this embodiment, each sub-reservoir is provided with a separate outlet for melt removal adjacent the end wall 16.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. A furnace for melting inorganic materials comprising:
   (a) a bottom,
   (b) first and second spaced-apart side walls;
   (c) first and second spaced-apart end walls;
   (d) a furnace interior bounded by said bottom, said side walls and said end walls;
   (e) spaced-apart inner walls extending between said end walls and dividing said furnace interior into a plurality of chambers each having a top and a bottom, each of said chambers having two sides, one of said sides being defined by one of said inner walls and the other of said sides being defined by another of said inner walls or by one of said side walls, at least one of said chambers being a liquefying chamber and at least one being a secondary chamber located adjacent said liquefying chamber;
   (f) a curved crown for each said liquefying chamber covering said liquefying chamber and having two edges extending along the sides of said liquefying chamber adjacent a top portion of the sides of said liquefying chamber;
   (g) a plurality of charge ports for each said liquefying chamber through which batch material is fed into said liquefying chamber for melting therein, said charge ports being located between said edges of the crown covering said liquefying chamber and the adjacent top portion of said sides of said liquefying chamber;

(h) means comprising at least one burner for each said liquefying chamber for developing heat-supplying flame that is directed longitudinally of said liquefying chamber between said end walls;

(i) said inner wall that defines a side of each said liquefying chamber being configured so that each said liquefying chamber is wider at the top of said liquefying chamber than at the bottom of said liquefying chamber and so that batch material entering said liquefying chamber through a charge port of said plurality of charge ports that is located adjacent said side defined by said inner wall moves down a surface of said inner wall where it is heated by the flame in said liquefying chamber;

(j) each said liquefying chamber having space inside for liquefied batch to collect at its bottom and for hot gases from said flame to collect above the liquefied batch;

(k) passage means leading from said liquefying chamber (i) for providing one or more passages between said liquefying chamber and adjacent secondary chamber through which liquefied batch that has collected on the bottom of said liquefying chamber can flow into said adjacent secondary chamber and collect on the bottom of said secondary chamber and (ii) through which hot gases developed by said burner in said liquefying chamber can exit the liquefying chamber, and (l) an outlet in said secondary chamber through which liquefied batch can be removed from said secondary chamber.

2. A furnace as defined in claim 1 and further including auxiliary heating means in at least one of said liquefying or secondary chambers for providing additional heating to the liquefied batch therein.

3. The furnace of claim 1 in which said outlet is located at said first end wall.

4. The furnace of claim 1 in which each of said inner walls is provided with said passage means defining said one or more passages between adjacent chambers.

5. The furnace of claim 1 in which the bottom of said liquefying chamber has, between said end walls, a downward slope of between 1 and 5 degrees in the direction of said second end wall.

6. The furnace of claim 1 in which said furnace bottom is provided with a partition dividing the liquefying chamber adjacent said furnace bottom into two separate sub-reservoirs, said partition isolating the liquefied batch in one sub-reservoir from that in the other.

7. The furnace of claim 1 wherein, as viewed along a transverse sectional plane parallel to said first end wall of the furnace, the cross-sectional area of said liquefying chamber intersected by said plane is greater than the cross-sectional area of said secondary chamber intersected by said plane.

8. The furnace of claim 1 wherein:
(a) a ceiling is provided at the top of said one secondary chamber covering the secondary chamber,
(b) a hopper for feeding the ports of said liquefying chamber with batch material is disposed above the ports, said hopper having a metal wall that extends along the length of said liquefying chamber,
(c) a roof is provided above the ceiling of said one secondary chamber defining a compartment bounded in part by the metal wall of said hopper, said ceiling, and said roof,
(d) hot gases from said liquefying chamber flow into said secondary chamber via said passage means, and additional passage means is provided for directing hot gases from said secondary chamber through said ceiling near said first end wall and then along the length of said compartment toward said second end wall, and
(e) the hot gases flowing through said compartment heat said metal wall and thus preheat the batch material within said hopper.

9. The furnace of claim 7 wherein at least one tube for supplying air to said burner extends through said compartment along the length of the compartment and is heated by hot gases flowing through said compartment, thereby heating the air flowing through said tube to said burner.

10. The furnace of claim 1 wherein:
(a) said inner wall defining the one side of said liquefying chamber comprises: (i) an upper portion having a generally vertical surface in the vicinity of the associated charge port along which batch material passing through said charge port initially moves into the associated liquefying chamber, and (ii) another portion beneath said upper portion with a surface for receiving batch material from said upper portion and sloping at an angle not less than the angle of repose for the batch material, and
(b) said inner wall is provided with projecting barrier means near the bottom of said sloping surface and above the normal liquid level in the associated liquefying chamber for blocking downward movement of solid batch material onto the bottom of said liquefying chamber.

11. The furnace of claim 10 in which said furnace bottom is provided with a partition dividing the liquefying chamber adjacent said furnace bottom into two separate sub-reservoirs, said partition isolating the liquefied batch in one sub-reservoir from that in the other.

12. The furnace of claim 10 in which the other of said sides of said liquefying chamber is defined by one of said side walls, wherein:
(a) a charge port of said plurality of charge ports is located between said side wall defining the other side of said liquefying chamber and the edge of the crown covering said liquefying chamber, and
(b) said side wall defining the other side of said liquefying chamber has projecting barrier means above the normal liquid level in the associated liquefying chamber for impeding downward movement of solid batch material fed through the charge port along the side wall onto the bottom of said liquefying chamber.

13. The furnace of claim 12 in which the barrier means on said side wall projects from the side wall by a greater distance than the barrier means on said inner wall projects from the inner wall.

14. The furnace of claim 1 in which:
(a) said plurality of chambers includes two of said liquefying chambers and one of said secondary chambers, the other side of each of said liquefying chambers being defined by one of said side walls, the sides of said secondary chamber being defined by two of said inner walls, said secondary chamber being located adjacent each of said liquefying chambers, and
(b) said secondary chamber receives liquefied batch and hot gases from both of said liquefying chambers through said passage means between the adjacent chambers.

15. The furnace of claim 14 wherein, as viewed along a transverse plane parallel to said first end wall of the furnace, the sum of the cross-sectional areas of the two liquefying chambers is greater than the cross-sectional area of the secondary chamber.

16. The furnace of claim 14 wherein said secondary chamber includes a partition projecting from the furnace bottom and extending between said end walls for dividing the bottom region of said secondary chamber into two separate reservoirs for respectively receiving liquefied batch from said two liquefying chambers.

17. The furnace of claim 14 in which the bottom of each of said liquefying chambers has a downward slope of between 1 and 5 degrees in the direction of said second end wall.

18. The furnace of claim 14 in which said furnace bottom is provided with a partition dividing the secondary chamber adjacent said furnace bottom into two separate sub-reservoirs for respectively receiving liquefied batch from the two liquefying chambers adjacent said secondary chamber, said partition isolating the liquefied batch in one sub-reservoir from that in the other.

19. The furnace of claim 14 wherein:
(a) a ceiling is provided at the top of said secondary chamber covering the secondary chamber,
(b) hoppers are provided for feeding the charge ports of the two liquefying chambers with batch material, each of said hoppers having a metal wall that extends along the length of said liquefying chambers,
(c) a roof is provided above the ceiling of said secondary chamber defining a compartment bounded in part by the metal walls of said hoppers, said ceiling, and said roof,
(d) hot gases from said liquefying chambers flow into said secondary chamber via said passage means, and additional passage means is provided for directing hot gases into said compartment from said secondary chamber through said ceiling near said first end wall and then along the length of said compartment toward said second end wall, and
(e) the hot gases flowing through said compartment heat said metal walls and thus preheat the batch material within said hoppers.

20. The furnace of claim 14 in which:
(a) each of said inner walls comprises: (i) an upper portion having a generally vertical surface in the vicinity of the associated charge port along which batch material passing through said charge port initially moves into the associated liquefying chamber, and (ii) another portion beneath said upper portion with a surface for receiving batch material from said upper portion and sloping at an angle not less than the angle of repose for the batch material, and
(b) each of said inner walls is provided with projecting barrier means near the bottom of said sloping surface and above the normal liquid level in the associated liquefying chamber for blocking downward movement of solid batch material onto the bottom of said liquefying chamber.

21. The furnace of claim 20 in which:
(a) a charge port of said plurality of charge ports is located between each of said side walls defining the other sides of said liquefying chambers and the edge of the crown covering each of said liquefying chambers, and
(b) each of said side walls defining the other side of each said liquefying chamber has projecting barrier means above the normal liquid level in the associated liquefying chamber for impeding downward movement of solid batch material fed through the charge port along the side wall onto the bottom of said liquefying chamber.

22. The furnace of claim 1 in which:
(a) said plurality of chambers includes one of said liquefying chambers and two of said secondary chambers, each of said secondary chambers being adjacent said one liquefying chamber, and the sides of said liquefying chamber being defined by two of said inner walls, and
(b) said secondary chambers receive liquefied batch and hot gases from said liquefying chamber through said passage means between the adjacent chambers.

23. The furnace of claim 22 in which:
(a) each of said inner walls comprises: (i) an upper portion having a generally vertical surface in the vicinity of the associated charge port along which batch passing through said charge port initially moves into the associated liquefying chamber, and (ii) another portion beneath said upper portion with a surface for receiving batch from said upper portion and sloping at an angle not less than the angle of repose for the batch, and
(b) each of said inner walls is provided with projecting barrier means near the bottom of said sloping surface and above the normal liquid level in the associated liquefying chamber for blocking downward movement of solid batch material onto the bottom of said liquefying chamber.

24. The furnace of claim 22 wherein, as viewed along a transverse sectional plane parallel to said first end wall of the furnace, the cross-sectional are of the liquefying chamber is greater than the sum of the cross-sectional areas of the two secondary chambers.

25. The furnace of claim 22 wherein:
(a) ceilings are provided at the top of each of said secondary chambers covering the secondary chambers,
(b) hoppers for feeding the charge ports of the adjacent liquefying chamber with batch material are disposed above the ports, each of said hoppers having a metal wall that extends along the length of the liquefying chamber,
(c) compartment roofs are provided above the ceilings of each of said secondary chambers defining two compartments bounded in part by the metal walls of the adjacent hoppers, the ceilings of the secondary chambers, and said compartment roofs,
(d) hot gases from said liquefying chamber flow into each of said secondary chambers via said passage means, and additional passage means are provided for directing hot gases from each of said secondary chambers into a respective compartment of said compartments located thereover through said ceiling of each said secondary chamber near said first end wall and then along the length of said compartment toward said second end wall, and
(e) said hot gases flowing through said compartments heat the metal walls of the hoppers and thus preheat the batch material within said hoppers.

26. The furnace of claim 25 wherein at least one tube supplying air to said burner extends through one of said compartments along the length of the compartment and is heated by hot gases flowing through said compartment, thereby heating the air flowing through said tube to said burner.

27. The furnace of claim 1 in which:
(a) said plurality of chambers includes a plurality of said liquefying chambers and a plurality of said secondary chambers, each of said secondary chambers being located adjacent a liquefying chamber of said plurality of liquefying chambers, the sides of each of said liquefying chambers being defined by two of said inner walls, and
(b) the secondary chambers adjacent a liquefying chamber receive liquefied batch and hot gases from said liquefying chamber through said passage means between the adjacent chambers.

28. The furnace of claim 27 in which:
(a) each of said inner walls comprises: (i) an upper portion having a general vertical surface in the vicinity of the associated charge port along which batch material passing through said charge port initially moves into the associated liquefying chamber, and (ii) another portion beneath said upper portion with a surface for receiving batch material from said upper portion and sloping at an angle not less than the angle of repose for the batch material, and
(b) each of said inner walls is provided with projecting barrier means near the bottom of said sloping surface and above the normal liquid level in the associated liquefying chamber for blocking downward movement of solid batch material onto the bottom of said liquefying chamber.

29. The furnace of claim 27 wherein, as viewed along a transverse sectional plane parallel to said first end wall of the furnace, the sum of cross-sectional areas of the liquefying chambers is greater than the sum of the cross-sectional areas of the secondary chambers.

30. The furnace of claim 27 wherein:
(a) ceilings are provided at the top of each of said secondary chambers covering the secondary chambers,
(b) hoppers for feeding the charge ports of said liquefying chambers with batch material are disposed above said ports, each of said hoppers having a metal wall that extends along the length of the liquefying chambers,
(c) compartment roofs are provided above the ceilings of each of said secondary chambers defining a plurality of compartments bounded in part by the metal walls of the hoppers, the ceilings of the secondary chambers, and said compartment roofs,
(d) hot gases from each of said liquefying chambers flow into the adjacent secondary chambers via said passage means, and additional passage means are provided for directing hot gases from each of said secondary chambers into a respective compartment of said compartments located thereover through the ceiling of each said secondary chamber near said first end wall and then along the length of said compartment toward said second end wall, and
(e) said hot gases flowing through said compartments heat the metal walls of the hoppers and thus preheat the batch material within said hoppers.

31. The furnace of claim 30 wherein at least one tube supplying air to said burner extends through one of said compartments along the length of the compartment and is heated by hot gases flowing through said compartment, thereby heating the air flowing through said tube to said burner.

32. The furnace of claim 27 in which one of said secondary chambers is provided with a partition dividing the bottom of said one secondary chamber into two separate sub-reservoirs for respectively receiving liquefied batch from the adjacent liquefying chambers of said one secondary chamber, said partition isolating the liquefied batch in one sub-reservoir from that in the other.

33. A method of melting inorganic materials comprising:
(a) providing the furnace of claim 1,
(b) feeding batch material into said liquefying chamber through the charge ports associated therewith,
(c) liquefying the batch material on said inner wall by heating, collecting the resultant liquefied batch at the bottom of the liquefying chamber, and transferring liquefied batch into said adjacent secondary chamber, and
(d) maintaining the liquid level of the liquefied batch in the liquefying chamber higher than the liquid level of the liquefied batch in the adjacent secondary chamber in the region where the liquefied batch flows between said liquefying chamber and said adjacent secondary chamber.

34. A method of melting inorganic materials comprising:
(a) providing the furnace of claim 1,
(b) feeding batch material into said liquefying chamber through the charge ports associated therewith,
(c) liquefying the batch material on said inner wall and collecting the resultant liquefied batch at the bottom of the liquefying chamber, and
(d) auxiliary heating said liquefied batch with electrical heating means while in said liquefying chamber.

35. A method of melting inorganic materials comprising:
(a) providing the furnace of claim 1,
(b) feeding batch material into said liquefying chamber through the charge ports associated therewith,
(c) liquefying the batch material on said inner wall by heating, collecting the resulting liquefied batch at the bottom of the liquefying chamber, and transferring liquefied batch into said adjacent secondary chamber, and
(d) heating said liquefied batch with electrical heating means while in said secondary chamber.

36. The method of claim 35 in combination with the additional step of auxiliary heating said liquefied batch with electrical heating means while in said liquefying chamber.

* * * * *